Patented May 1, 1945

2,374,692

UNITED STATES PATENT OFFICE 2,374,692

OXIDIZED SOYBEAN OIL AND PLASTIC COMPOSITIONS CONTAINING THE SAME

Ellis Miller, Brussels, Belgium

No Drawing. Application April 30, 1938,
Serial No. 205,390

19 Claims. (Cl. 273—63)

The present invention relates to oxidized soy bean oil compositions, and more particularly to a method of producing an oxidized soy bean oil product and plastic compositions containing such product. The invention relates also to golf balls having covers composed of or containing such plastic compositions.

I have found that soy bean oil can be oxidized under certain conditions to produce an elastic product which is suitable for use especially in the plastic arts, such product in particular being capable of being mixed or incorporated with known plastic materials such as crepe rubber, balata, synthetic rubber and other gummy and rubbery materials and related products. When employed in such plastic compositions it imparts new and unexpected properties thereto, and by reason, further, of its low cost it represents a very desirable ingredient for various plastic compositions and especially of rubber and balata compositions.

The oxidized soy bean oil prepared by me has proved to be of particular utility and advantage in connection with rubber compositions employed for the covering of golf balls and similar articles where it is subjected to severe impact, and I shall accordingly further describe my invention in greater detail in connection with the application of oxidized soy bean oil in the manufacture of a cover for golf balls, although it will be evident to those skilled in the art that the soy bean oil product made by me, and also the balata and rubber composition containing the same, are adaptable for a great variety of uses.

In the manufacture of golf ball covers, two general grades are ordinarily manufactured; one is a high priced material and is made of a vulcanized or unvulcanized composition consisting almost completely of balata, which is a very high priced gum, while the other contains large amounts of cheaper and softer rubber. Professional and expert non-professional golfers generally prefer the unvulcanized (balata) cover because of its desirable "feel" and especially because it gives a sharp, clear "click" when properly struck with a club, which is the sound associated with an expert stroke. Vulcanization, which toughens and hardens the cover, destroys this feel and click. The ball made with the known unvulcanized high balata content cover is, however, unsuited for use by inexpert players because, in addition to being quite expensive, it is relatively soft compared with the vulcanized cover, and is rapidly torn or broken when the ball is sliced or "topped" by poorly aimed strokes.

To meet the demand for a lower priced golf ball, manufacturers have had to reduce the content of balata and substitute cheaper gums. These compositions, being even softer than the high balata composition, must be vulcanized to produce a serviceable ball, especially one that will withstand slicing and topping to a reasonable degree. This additional step of vulcanization adds, of course, to the cost of manufacture both because of the expense involved in the vulcanization process itself and because it lengthens the processing time and ties up large quantities of the article in the factory. Moreover, it is highly desirable to avoid vulcanization because the highly active chemicals and the high temperatures employed therein have a deleterious effect on the cover and also on the tightly wound and stretched rubber threads of the center.

Aside from the fact that the production of the cheaper golf balls having the necessary toughness and strength involves the manufacturer in the dilemma of adding the further step of vulcanization to the manufacturing operations, the processing cost for the cheap balls being thus higher than for the unvulcanized, higher-priced balls, the vulcanization has the serious disadvantage that it destroys the "click" that the golfer associates with a well-aimed stroke, and also the feel. The inexpert player and also the economical player, being constrained to play only with the stronger, vulcanized ball, were compelled to forego the satisfaction of experiencing the click and feel which is a part of the pleasure of the game.

There has, accordingly, been a demand for a long time for a golf ball which is inexpensive to manufacture and yet has the desirable click and feel that the player associate with a stroke of professional quality. In particular, it has for a long time been sought to produce a golf ball cover of inexpensive composition which, like the more expensive high balata content plastics, did not unavoidably require vulcanization and preferably one which even without vulcanization was tougher and harder than at least the unvulcanized balata composition so as to be suitable for inexpert players; that is, the majority of players.

I have found that soy bean oil in the oxidized, gelled and resilient condition, can be incorporated with rubber materials of various kinds to produce a uniform composition which is of general application in the plastic arts and which, when employed in compositions for the manufacture of covers for golf balls, presents the remarkable property that it is much harder and stronger than the known, much more expensive balata composition even without vulcanization, and at the same time yields the desirable click when a golf ball covered therewith is struck by a golf club and possesses also the feel that is sought in golf balls. Thus a cover made of oxidized soy bean oil, rubber and balata, which will be described more in detail below, is extremely tough and hard and also highly resilient, and deliberate attempts to cut or slice a ball made in accordance with the invention have produced only insignificant nicks in the surface of the cover. This toughness and hardness is obtained, as already mentioned, without the aid of vulcanization and exceeds the toughness and hardness of the higher priced unvulcanized balata covers now in use; in fact, the unvulcanized cover prepared by me is quite as strong as vulcanized balls heretofore made.

The soy bean oil may be brought to the oxidized, gelled condition in various ways but I prefer to accomplish the oxidation by subjecting extremely thin films of the oil to elevated temperatures in the presence of air or oxygen. Either the crude or refined oil may be employed; a crude oil has been found by me to give very satisfactory results and in certain instances may be found to be superior to the refined product. Prior to oxidation of the oil in the form of thin films, the oil may be subjected to a preliminary oxidation and/or polymerization treatment by blowing air through the oil in bulk, with constant stirring at a temperature of 465 to 469° F. for about six hours. The oil should contain about 1% of cobalt linoleate or other known drier to hasten the drying of the oil. In this way there is obtained a highly viscous product which can more quickly be converted into the semi-solid gel condition by the subsequent oxidation than the original oil. The viscous pretreated oil is spread in very thin films (of the order of 0.005–0.006 inch) upon glass, steel, or other plates, and is heated in an oven, preferably an electric oven, at about 175° C. (347° F.) for not more than about two hours, air or oxygen being supplied at a rate sufficient to effect oxidation of the whole film of oil. The films of oil may enter the oven at one end while the air or oxgen is supplied at the other end. Care should be taken to insure spreading of the material in a thin film as oxidation is completed very rapidly upon the outside surface and the oxidized superficial layer tends to retard the oxidation of the oily material beneath it. With films of the thickness of the order indicated, no difficulties are encountered in the "drying."

If desired, the oil can be spread immediately, that is, without previous oxidation and/or polymerization in bulk, upon a glass or a steel surface, and subjected to a temperature of 175° C. (347° F.) for a period of four to six hours, the oven being supplied with air or oxygen as above described. The four-hour treatment will yield a gelled film of deep golden color, while the six-hour treatment will yield a film of dark brownish-red color which in certain compositions will yield a harder material. Care should, however, be taken not to over-oxidize the film to the brittle or burnt condition. The dried film can be removed from the supporting plates by means of a knife or blade in a manner well understood in the art of producing films.

The oxidized soy bean oil so obtained can be mixed in various proportions with different kinds of gums, such as balata and natural and synthetic rubber. Thus, from 5 to 25 parts of oxidized soy bean oil may be mixed with 95 to 75 parts of the following composition:

| | Percent |
|---|---|
| Balata | 80–85 |
| Crepe rubber | 20–15 | to which about 5 to 10% of titanium oxide and 3 to 5 parts of zinc oxide, by weight of the total gum, have been added. The oxidized soy bean oil and the balata-rubber composition may be mixed on the rolls at about 120–130° F. The working up of the mixture can take place in accordance with any suitable one of the processes now in use for manufacturing rubber mixtures.

The plastic composition so obtained is preferably, though not necessarily, aged for one or more days and is then ready to be cut, shaped and molded upon a golf ball core. The molding and finishing operations are carried out in any known manner, for example, in accordance with the procedure described in the patent to Geer No. 1,524,428.

It may, however, be mentioned that since the moldable composition prepared in accordance with the invention need not be vulcanized and thus will ordinarily contain no vulcanizer, no exceptional precautions need be taken in working it up, such as must be exercised in connection with known vulcanizable mixtures to prevent air curing or curing on the mill. The moldable sheets may be cut in known manner into pieces which are then formed into hemispherical sections while warm, and two such sections then applied upon the golf ball center upon opposite sides thereof and pressed thereon until the two halves of the cover become firmly fixed to each other and to the ball center. The latter operation may be performed in one or more steps, the last step being preferably conducted under heat. The temperature employed need not be as high as that employed in forming a vulcanized cover (about 220° F.) since no optimum vulcanization temperature need be reached, the temperature employed being sufficient only to temporarily soften the cover and insure that the two halves are pressed into a unitary structure which is firmly secured to the center.

The plastic composition coming from the mixing rolls has heretofore been in the form of a sheet of a thickness of the order of that of the cover on the golf ball. I have found, however, that superior results are obtained by rolling the sheets down to a thickness of about 5 or 6 one-thousandths of an inch, such sheets being stronger transversely of their length, and then placing these sheets in alternating cross-grain fashion, up to the desired thickness, after which they are pressed, either cold or at a slightly elevated temperature. In this way, a uniform mass is obtained which has a higher strength than the thick sheet obtained from the rolls as heretofore. If desired, the thin sheets may be covered with a resin powder, such as a kauri resin, or such resin may be incorporated in the plastic composition the resin acting as a binder for the pressed sheets. I have found that this method of manufacture is highly advantageous also for balata and balata-rubber sheets containing no oxidized soy bean oil, the very thin sheets being powdered with or having incorporated therein a small quantity of kauri or other resin to enable the sheets to be handled.

It will be understood that the various proportions, times and temperatures above given may be considerably varied within the skill of those engaged in this art without departing from the prin ciples of the invention. Thus, in the oxidation of the soy bean oil, a longer time of treatment may be carried out at lower temperatures or a shorter time of treatment at higher temperatures. In any event, care should be taken that the oil is not brought to a condition in which it is no longer able to produce a hard, moldable composition with balata or other rubbery gums. The proportion of oxidized oil in the molding composition can likewise be varied within wide limits depending upon the uses to which the composition is to be put.

Thus, 30 parts of oxidized soy bean oil can be mixed with 30 parts of crepe rubber, and this composition can then be combined with 60 parts of balata together with any desired pigment material. This composition, like that specifically described hereinabove, can be molded cold, or after heating it in hot water, so that the interior of the golf ball, that is, the core and the rubber threads wound under high tension upon the core, are not subjected to any considerably elevated temperature and thus are not subjected to the rubber-deteriorating influences which exist when rubbery materials are vulcanized at the high temperatures necessary for vulcanization and especially rapid vulcanization.

Where in the claims I employ the word "gum" such term is to be understood to include balata and natural and synthetic rubbers and other rubber-like materials.

I claim:

1. The method of producing a material suitable for the manufacture of golf ball covers, comprising oxidizing soy bean oil at elevated temperatures until an elastic gelled mass is obtained, and then mixing the latter with a rubbery gum in such proportions that a hard, tough, moldable material is obtained.

2. The method according to claim 1, wherein the oxidized soy bean oil is mixed with balata.

3. The method of producing a material suitable for the manufacture of golf ball covers comprising oxidizing soy bean oil at elevated temperatures until an elastic gelled mass is obtained, and then mixing the latter with crepe rubber and balata in such proportions that a hard, moldable material is obtained.

4. The method of producing a moldable material suitable for the manufacture of golf ball covers, comprising oxidizing soy bean oil at elevated temperatures until an elastic gelled mass is obtained, and then incorporating the latter in a mixture of approximately 80–85% of balata and 20–15% of crepe rubber.

5. The method of producing a material suitable for the manufacture of golf ball covers, comprising heating thin films of soy bean oil at elevated temperatures in the presence of oxygen until an elastic gelled film is formed, and then mixing said film with balata until a homogeneous moldable mass is obtained.

6. The method of producing a moldable material suitable for the manufacture of golf balls which comprises mixing a minor proportion of oxidized soy bean oil and a major proportion of a rubbery natural gum.

7. The method of producing a material suitable for the manufacture of golf ball covers, comprising initially bodying soy bean oil by passing air therethrough at elevated temperatures until a viscous material is obtained, spreading said material in the form of thin films upon a heat-resistant surface, subjecting the films to elevated temperatures in the presence of oxygen until an elastic gelled mass is formed, and then mixing said mass with balata in such proportions that a tough, hard, moldable mass is obtained.

8. The method of producing a material suitable for the manufacture of golf ball covers, which comprises blowing air through a mass of soy bean oil while maintaining the same at a temperature of about 465° F. until a viscous condition is reached, spreading the viscous, partially oxidized oil in the form of thin films upon a heat-resistant surface, subjecting the films to a temperature of about 347° F. in the presence of oxygen until the gel condition is reached, and then mixing the product with balata in such proportions that a hard and tough moldable material is obtained.

9. A golf ball having a cover containing an oxidized soy bean oil.

10. A golf ball having a cover composed of an unvulcanized mixture of a gum and an oxidized soy bean oil.

11. A golf ball having a cover composed of an unvulcanized composition including balata and an oxidized soy bean oil.

12. A golf ball having a cover composed of a mixture of balata and an oxidized soy bean oil, the latter composing about 8 to 25% of the mixture.

13. A golf ball having a cover composed of an unvulcanized mixture of a minor proportion of an oxidized soy bean oil, a major proportion of at least one member of the group consisting of balata and natural and synthetic rubbers, and containing titanium and zinc oxides.

14. The method of producing a thermo-plastic material suitable for the manufacture of golf ball covers, comprising heating soy bean oil in the presence of oxygen until an elastic, thermo-plastic gelled mass is obtained and then mixing the latter with a larger amount of a natural rubbery material.

15. The method of producing a thermo-plastic material suitable for the manufacture of golf ball covers, comprising mixing oxidized soy bean oil in the elastic, thermo-plastic gelled condition with a larger amount of a mixture composed of a major proportion of balata, and a minor proportion of crepe rubber until a uniform composition is obtained.

16. A golf ball having a center and a molded cover thereabout, formed of a thermo-plastic sheet made by pressing a number of rolled plastic sheets, having a grain in the direction of rolling with their grains arranged alternatingly at right angle to each other, said plastic sheets being composed of a mixture of a thermo-plastic, oxidized soy bean oil product, and a natural, rubbery material.

17. A plastic material suitable for the manufacture of golf ball covers, comprising a homogeneous mixture of gelled soy bean oil and a gum.

18. A plastic material suitable for the manufacture of golf ball covers, comprising a homogeneous mixture of a minor proportion of a substantially solid, elastic, gelled soy bean oil material and a major proportion of a mixture of balata and crepe rubber.

19. The method of producing a moldable material suitable for the manufacture of golf ball covers, comprising oxidizing soy bean oil at elevated temperatures until an elastic gelled mass is obtained, and then incorporating 5 to 25 parts of the latter in 95–75 parts of a mixture of approximately 80–85% of balata and 20–15% of crepe rubber.

ELLIS MILLER.